US00RE33873E

United States Patent [19]

Romano

[11] E Patent Number: Re. 33,873

[45] Reissued Date of Patent: Apr. 7, 1992

[54] MICROCOMPUTER CONTROLLED COMBINATION LOCK SECURITY SYSTEM

[76] Inventor: James Romano, 29 Wood St., Auburn, N.Y. 13021

[21] Appl. No.: 547,840

[22] Filed: Jul. 3, 1990

Related U.S. Patent Documents

Reissue of:

[64] Patent No.: 4,755,799
Issued: Jul. 5, 1988
Appl. No.: 834,004
Filed: Feb. 27, 1986

[51] Int. Cl.[5] ..... E05B 45/06

[52] U.S. Cl. ..... 340/543; 340/542; 340/825.31; 361/172; 318/282; 318/466; 70/278; 70/280; 292/144

[58] Field of Search ..... 340/543, 542, 686, 825.31, 340/825.32, 825.34; 361/171, 172; 318/282, 466, 467, 468; 70/278, 280, 291, 277, 382; 292/144; 307/10.4, 10.5

[56] References Cited

U.S. PATENT DOCUMENTS

| | | | |
|---|---|---|---|
| 3,891,980 | 6/1975 | Lewis et al. | 340/825.31 |
| 4,250,533 | 2/1981 | Nelson | 340/825.31 |
| 4,455,588 | 6/1984 | Mochida et al. | 340/825.31 |
| 4,532,507 | 7/1985 | Edson et al. | 340/825.31 |
| 4,568,998 | 2/1986 | Kristy | 340/825.31 |
| 4,591,852 | 5/1986 | Brod | 340/825.31 |
| 4,604,708 | 8/1986 | Lewis | 340/825.31 |
| 4,672,826 | 6/1987 | Mombelli | 70/278 |

OTHER PUBLICATIONS

I.C.B. Corporation of 133 Seaview Drive, Secaucus, N.J.; "Motorized Electric Locking and Door Management Systems" 6-1990.

*Primary Examiner*—Donnie L. Crosland
*Attorney, Agent, or Firm*—Charles S. McGuire

[57] ABSTRACT

A security system includes a microcomputer with an auxiliary read-only memory and a key device including a similar read-only memory, each of the read-only memories containing corresponding pluralities of corresponding binary combination codes. Under the control of the microcomputer the codes are read and compared. If the combination and the sequence do not compare, the system will not unlock and an alarm will be generated. The read-only memories are of the programmable type, so that changes in the combinations and sequences can be accomplished easily. A plurality of visual indicators and an audible alarm provide the user and personnel in the secure area with information concerning the status of the system.

16 Claims, 9 Drawing Sheets

MICROCOMPUTER CONTROLLED COMBINATION LOCK SECURITY SYSTEM

Matter enclosed in heavy brackets [ ] appears in the original patent but forms no part of this reissue specification; matter printed in italics indicates the additions made by reissue.

BACKGROUND OF THE INVENTION

My invention relates to security systems and particularly to security systems which combine the advantages of low cost reliable integrated circuits and a microcomputer to attain the advantages of cryptographic encoding at minimum expense and complication.

Security systems employing electro-mechanical bolts or locks, controlled by electrical circuits requiring a combination of electrical inputs for unlocking, are well known in the art. Many of these systems employ wired digital logic to insure that only a proper combination of inputs will operate the locking mechanism. Such systems are complex to design and manufacture and would require extensive physical wiring changes to change the combinations of inputs required to unlock the system.

Also, prior systems have relied on a single number value, generally encoded in binary form, such as an 8-bit combination which would provide the equivalent of decimal numbers from 0 to 256 (28). Such arrangements can be rather easily defeated, since it is relatively simple to build a circuit arrangement which will quickly generate a sequence of all of the possible combinations, and by supplying this sequence to the security systems input, the unlocking sequence will be quickly found. More secure systems relay on such binary coded numbers and/or a set or keyboard entered numbers which must be remembered by the user, such as with card entry systems. U.S. Pat. Nos. 3,821,704; 4,286,305 and Re. 29,846 are exemplary of such prior art.

OBJECTS OF THE INVENTION

Accordingly, it is a principal object of my invention to provide an improved security system which employs a microcomputer rather than hard wired logic.

Another object of my invention is to provide a security system which uses a microcomputer and cryptographic principles to provide a security system which is highly immune to unauthorized operation.

A further object of the invention is to provide a security system of the type described which is easy to install and maintain, and economical to manufacture.

Still another object of the invention is to provide a system of the type described which by using a plurality of n-bit binary combinations greatly increases the security of the system.

Another object of the invention is to provide a security system of the type described in which a plurality of n-bit binary numbers are read in sequence from a key device, and the numbers as well as the sequence must be correct to render the system operative, eliminating the need for a key pad number entry.

A further object of the invention is to provide a security system of the type described in which tampering with the system by unauthorized persons will not only operate an alarm device, but will also render the system inoperative for a predetermined time.

Still another object of the invention is to provide a security system of the type described in which a coded key device is employed to unlock the system from outside the secured area, but only conventional push button need to be operated to unlock the system from inside the secured area.

A further object of the invention is to provide a security system of the type described in which the code contained in the key device can be modified or changed quickly by a computer system arranged to provide the new code to the key device.

Yet another object of the invention is to provide a security system of the type described in which automatic relocking of the system is provided if the door or other protected device is not opened or otherwise operated within a predetermined time interval.

Still another object of the invention is to provide a security system of the type described in which a microcomputer controls the system, and wherein it is not possible for unauthorized parties to gain access to the microcomputer program.

SUMMARY OF THE INVENTION

The present invention is a security system for permitting access to a secure area through a door, gate, turnstile or other controllable entry means, by means of an electronic key comprising a read-only memory enclosed in a suitable housing and having a plurality of electrical connections extending therefrom. Insertion of the key in a slot establishes electrical connections extending to the key. A microcomputer in the system checks that the key is of the proper type, and then energizes reading means to establish data transfer circuits from the read-only memory in the key to the data inputs of the microcomputer. A plurality of successive binary numbers are read out of the key and checked against pre-stored numbers in the read-only memory directly connected to the microcomputer. If the stored numbers correspond with the numbers of the key the security system will unlock the entry of the secured area, otherwise an alarm signal will be generated. The entry must be used within a predetermined time interval following the unlock signal, otherwise the unlock condition will be terminated and the system will automatically relock. If the entry is used properly the unlock condition will be maintained until the entry is manually restored to its secure condition, e.g., the door is closed by the user, after which the system is restored, and the locked condition is again effective. For operation from within the secure area, a manually operated circuit is employed, governed, for example, by a push button located within the secure area. A plurality of indicating devices, such as light-emitting diodes, are provided to inform users of the system of its status.

BRIEF DESCRIPTION OF THE DRAWINGS

The foregoing objects and other features of the invention and its advantages will become more fully understood from the following detailed description when considered with the accompanying drawings, in which.

Similar reference characters refer to similar parts in each of the several views.

DETAILED DESCRIPTION OF THE INVENTION

Figure 1:
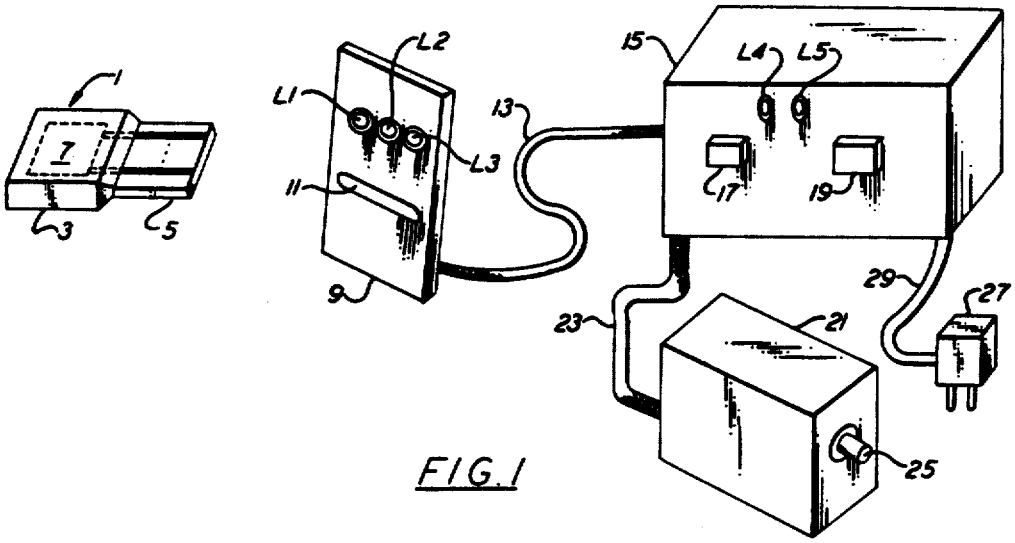
FIG. 1 is a simplified schematic illustration of a security system in accordance with a first preferred embodiment of the invention.

Referring now to the drawings, FIG. 1 shows a highly diagrammatic view of the principal elements of a single station security system which embodies the present invention, Key device 1 comprises a housing portion 3 and an electrical connector portion 5. Within housing 3 there is a read-only memory device 7, which has its terminal electrically connected to the connector portion 5. The key device is constructed and arranged so that it can be carried about by the user in the same manner as conventional mechanical keys, and is relatively rugged and unharmed by conventional rough treatment, dirt, moisture, and the like.

Located near but exterior to the secure area is a key reader 9 including a front plate having a slot 11 therein, which is designed to receive the connector portion 5 of the key device 1. A plurality of indicator devices such as LED's L1, L2 and L3 are located on the front plate of the key reader, to be plainly visible to a user of the system. The key reader 9 establishes electrical connections between the electrical connector portion of key device 1, and the conductors in a connecting cable 13, which extends between the key reader and a control box or housing 15.

Housing 15 is located within the secure area, and contains the logic circuitry, certain of the timers, the microcomputer, and other electrical and electronic elements of the invention. Control switches 17 and 19 are mounted on the front panel of housing 15, as are a plurality of LED indicators L4 and L5. An electromechanical lock mechanism 21 is connected to the control housing 15 by a multi-conductor cable 23.

Lock mechanism 21 may comprise, for example an electric motor which by suitable gearing or otherwise, drives a bolt 25 between an extended position as shown and a retracted position. When the bolt 25 is fully extended, it prevents any access to the secure area. The position of the bolt is detected by suitable limit switches, to be later described. Also, the closed condition or open condition of the access device such as a door, is detected by one or more limit switches, which may be conveniently located in the lock housing 21.

Electrical power for operation of the system is supplied from a small plug-in type of power supply of the well-known type which can be plugged into a convenient 110–120 volt power outlet. Rectified direct current is supplied from supply 27 to the control box via cable 29.

Figure 2:
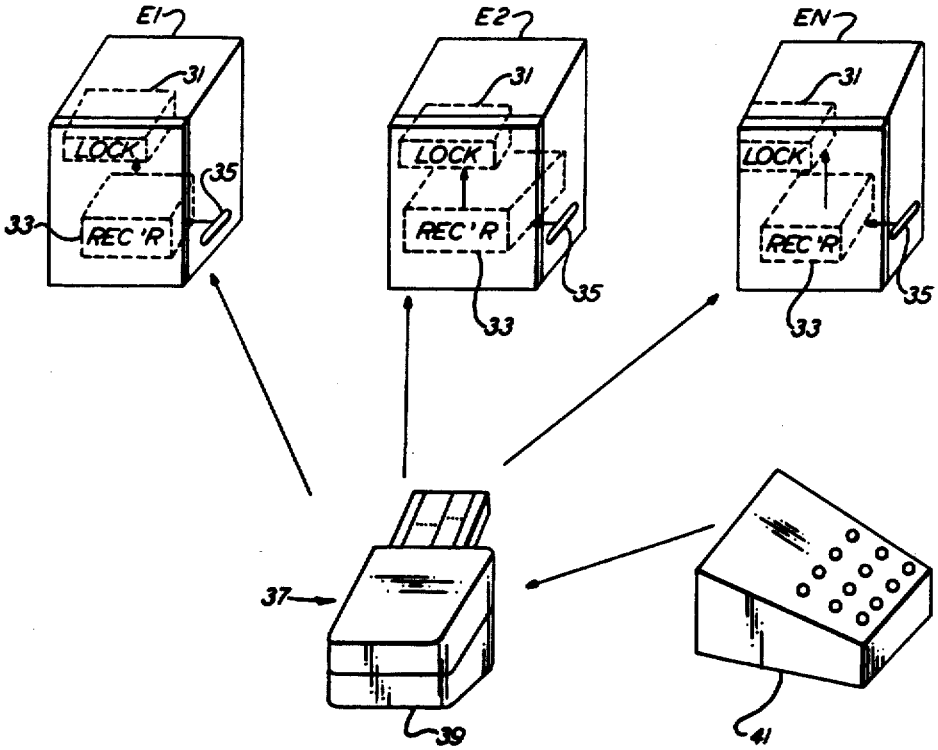
FIG. 2 is a simplified schematic illustration of a security system in accordance with a second preferred embodiment of the invention, FIGS. 3A, 3B and 3C, taken together in the order named, comprise a schematic block diagram of the electronic circuits and microcomputer employed in the invention.

FIG. 2 illustrates another embodiment of the invention particularly suited to control the access to a plurality of restricted volumes, such as enclosures for railway signal apparatus, cable TV junction boxes, etc. Three such enclosures are shown, and designated by reference characters E1, E2 and EN. Each of the enclosures has therein a suitable lock device 31, and a receiver 33, the latter having inputs from an associated key reader indicated symbolically by the slots 35. The key device 37 is greatly similar to the key device 1 of FIG. 1, except that it has an additional element 39, which comprises a housing having therein a small rechargeable battery for supplying operating power to the key. This embodiment also provides a master programming module 41 to provide appropriate coding for the receivers and the keys, and may include means for providing a limited charge to the key battery so that the key is only operable for a predetermined number of hours for each charge.

Figure 3A:
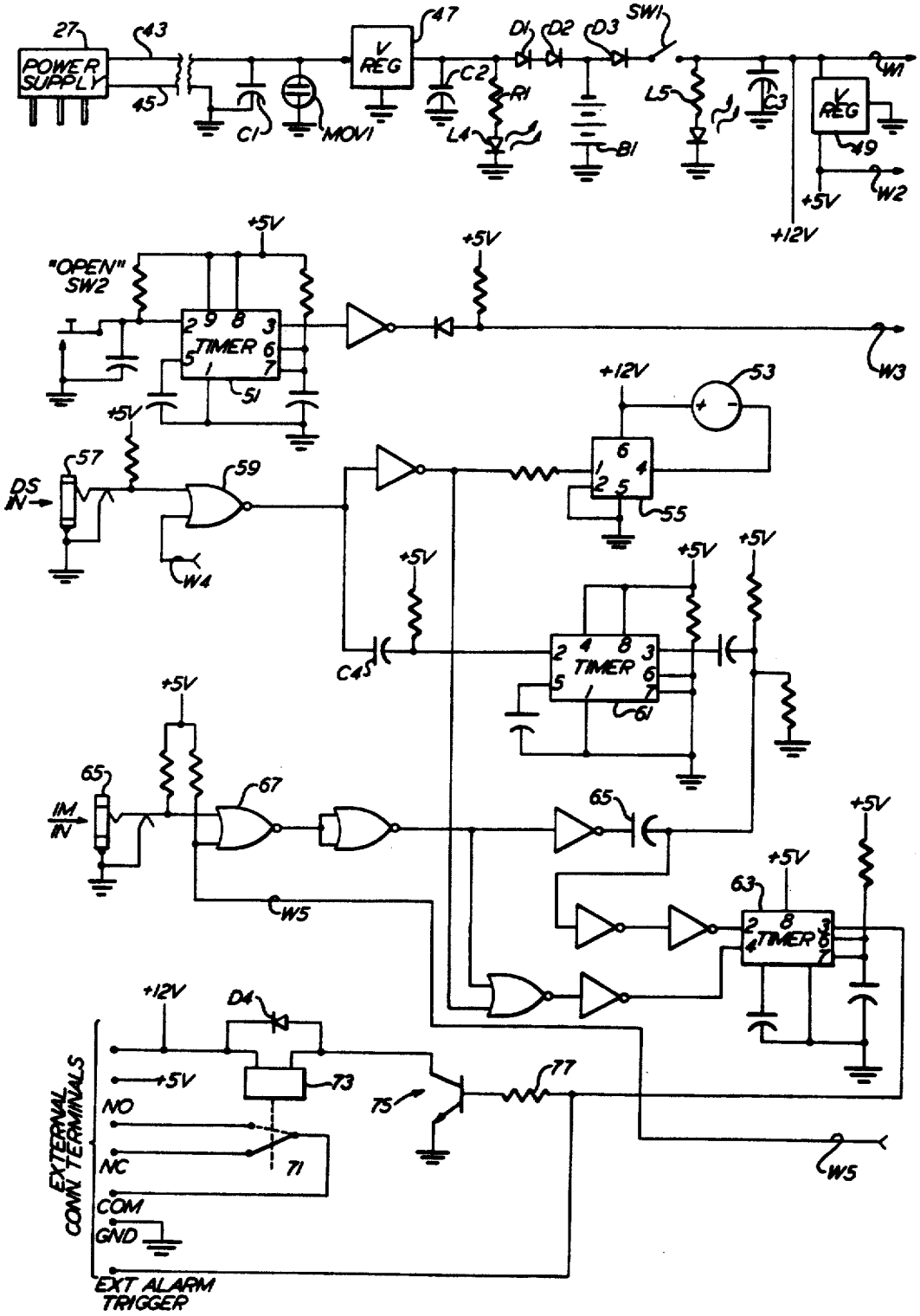
Figure 3B:
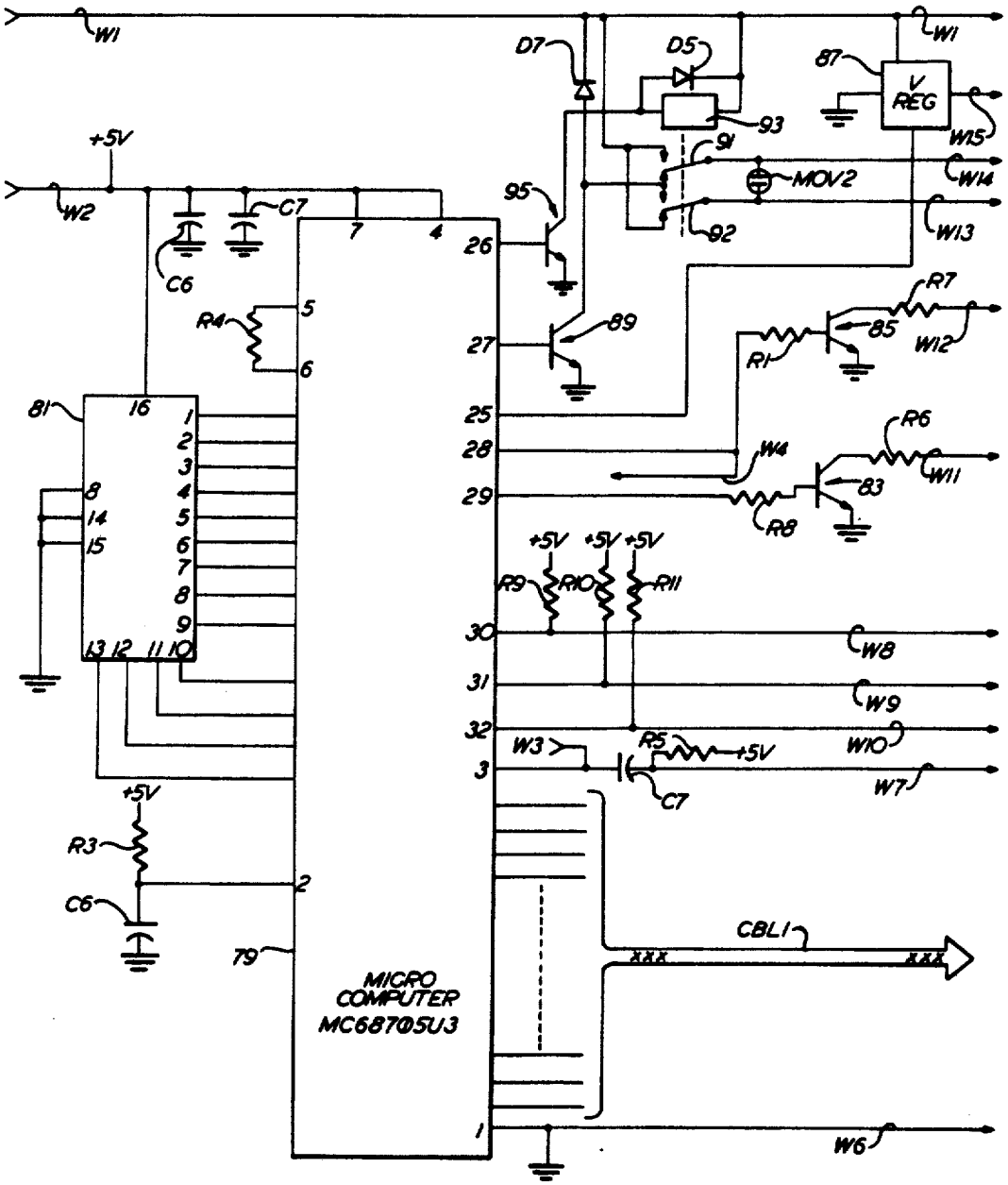
Figure 3C:
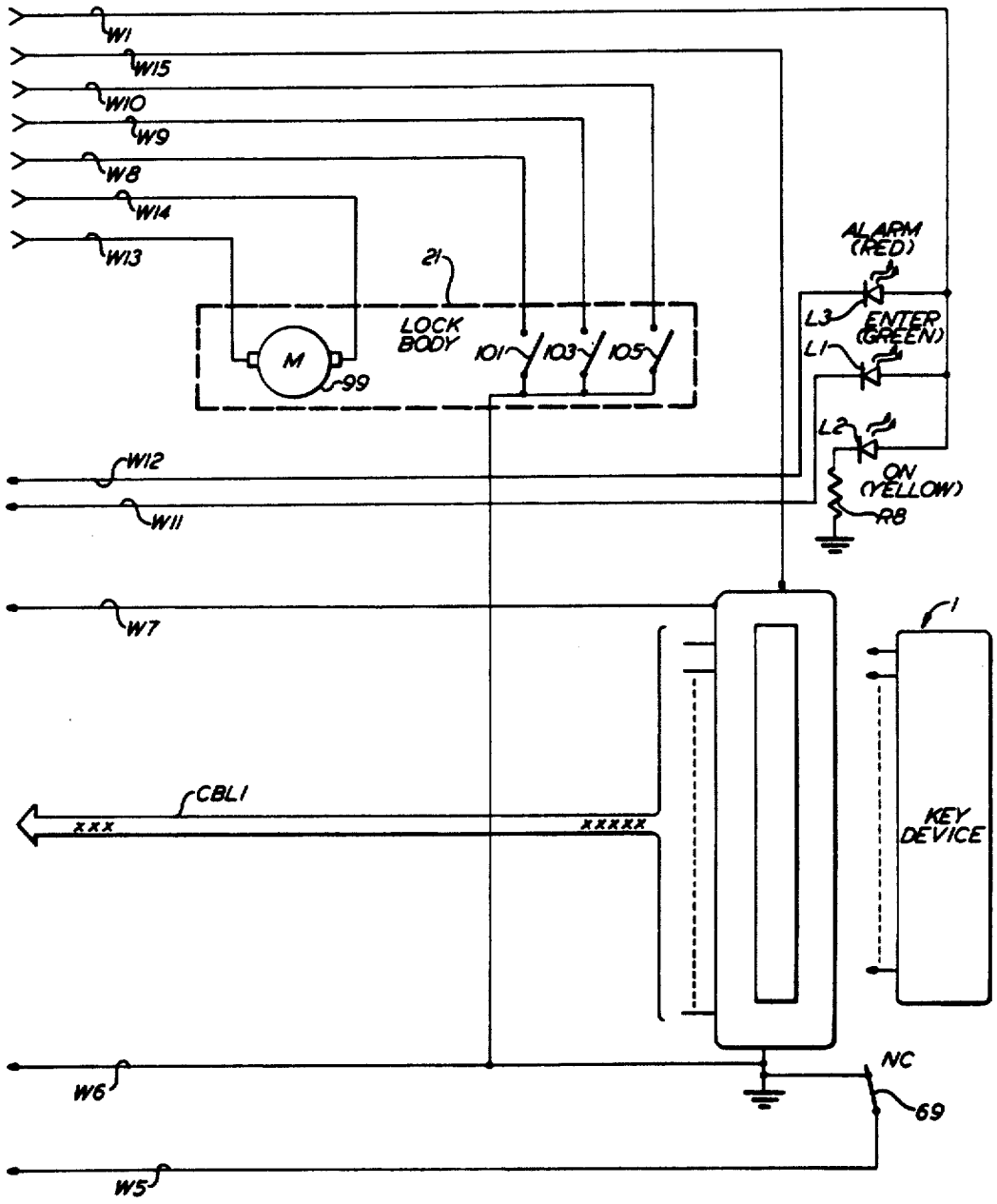

Referring now to FIGS. 3A, 3B and 3C, they should be arranged with FIG. 3A to the left of Figure 3B, and FIG. 3C to the right of FIG. 3B. The power supply circuits are shown at the top of FIG. 3A. The plug-in supply unit 27 is connected to the control housing 15 by the wires 43 and 45, being the positive and negative leads, respectively, with the negative being connected to the system ground, with a first filter capacitor C1 and an over-voltage protector MOV1 connected to the positive lead, which is then connected to the input of a first three-terminal voltage regulator 47, the output of which is connected to a filter capacitor C2, and via a resistor R1 to the LED indicator L4 which is used to indicate that charging power is being supplied to the unit. The series connected steering diodes D1, D2, and D3 insure that the charging current to battery B1 and the current to the operating circuitry are correctly poled. Switch SW1 governs the supply of direct current to the system. The LED indicator L5 shows whether or not the power is on. Filter capacitor C3 is connected to the input side of the voltage regulator 49.

From the input side of regulator 49, a wire W1 is indicated as leaving FIG. 3A. This convention will hereafter be used to identify wires running from one figure of the drawings to another, eliminating the need for matching the position of the lines on adjoining drawings. In other words, a reference character such as W1 will indicate the same conductor, wherever it occurs in the drawings. The voltage on wire W1 may be for example, 12 volts and the voltage at the output of regulator 49 and on wire W2 may be, for example, 5 volts.

Operation of switch SW2, the "OPEN" control, which is a push-button, initiates the operation of a triggered monostable circuit comprising a type 555 integrated circuit timer 51 and associated components connected in a well-known configuration. The output is initiated by the operation of the push button and continues for a predetermined time. The output is inverted and the resulting negative-going pulse is supplied to a line W3 to initiate an interrupt operation of the microcomputer.

An audible alarm 53 is provided to indicate the operation of the system under proper as well as improper conditions, and it is energized by a driver unit 55 which is driven in turn by an input circuit including a delayed sensor input jack 57. This jack normally grounds one input to the NOR gate 59 but when a proper input is provided to jack 57 from some type of external sensor, the output of the driver 55 will cause alarm 53 to sound. The second input to NOR gate 59 is a wire W4 which is an output from the microcomputer which is active under certain alarm conditions as will be later explained.

An output from NOR gate 59 is also supplied via capacitor C4 to a second 555 timer circuit, 61 which at the termination of its delay period supplies a pulse to yet another 555 circuit 63 which supplies an output to circuitry for governing external alarms, to be subsequently described.

A second alarm circuit which provides an immediate alarm rather than the delayed alarm described above, includes an input jack 65, similar to the jack 57 associated with the delayed sensor input. This jack is connected to one input of NOR gate 67. The second input of the NOR gate 67 is connected to ground at the key reader via a wire W5 and a normally-closed tamper switch 69 in the key reader. Improper use of the key reader or tampering with the device will cause switch 69 to open thereby removing the ground from the second input to NOR gate 67. The output of NOR gate 67 is supplied through the succeeding logic devices and a capacitor C5 to the trigger input of timer 63. It will be apparent to those skilled in the art that this arrangement will cause an output to appear at the output pin 3 of the timer 63 shortly after an alarm signal has been supplied from the NOR gate 67.

A plurality of external connection terminals are provided on the housing 15, preferably on the rear side thereof to accomodate external alarm devices, particularly those which require considerable operating power, e.g., an electric siren. As shown in FIG. 3A, the terminals provide connections to +12 V., +5 V., ground, and the normally-open, normally-closed; and common contact 71 of a relay having an operating coil or winding 73 bridged by a snubbing diode D4. The relay winding is energized by a circuit including a transistor driver 75, which has its base connected to the output pin 3 of timer 63 via resistor 77. When relay winding 73 is energized contact 71 transfers from its normally-closed to its normally-open contact, and opens and/or closes the external circuitry connected to the terminals NO, NC, and COM. The relay contacts may be selected to handle much larger amounts of power than the solid state logic circuits. There is also provided an external connection terminal designated EXT ALARM TRIGGER, which is directly connected to pin 3 of timer 63.

It is apparent from the foregoing that the present invention can supply both on-board and external alarms to indicate the condition of the system.

Referring now to FIG. 3B, there is shown a microcomputer 79 and a read-only memory 81, which are principal components of the present invention. The microcomputer is a single chip type, 8-bit EPROM microcomputer containing a CPU, on-chip clock, EPROM, bootstrap ROM, RAM, I/O, and a TIMER. A commercially available type is manufactured by Motorola, Inc., and is known as the MC68705U3. Complete technical information is contained in an Advance Information publication ADI-859 R1, copyright Motorola, Inc., 1981, which is incorporated herein by reference. The read-only memory is a type AM27S19, and is used to store the codes which are also stored in the key devices. The microcomputer and the ROM 81 have a plurality of pin connections, the identification numbers being shown within the rectangles indicated by reference characters 79 and 81. The location of the pin numbers is not necessarily indicative of their actual location on the DIP modules.

Power is supplied at +5 volts via wire W2, with by-pass capacitors C6 and C7 being connected to the +5 volt line adjacent the microcomputer and the ROM, the negative power pins on these modules being connected to the system ground and hence to the negative side of the 5 volt power supply. +5 volts is supplied to pin 16 of ROM 81 and pins 4 and 7 of microcomputer 79, and ground is connected to pins 8, 14 and 15 of the ROM and to pin 1 of the microcomputer. The resister R4 connected between pins 5 and 6 of the microcomputer governs the frequency of the internal clock. A resistor R3 and a capacitor C6 are connected in series between +5 v. and ground, and their junction is connected to pin 2 of microcomputer 79. This arrangement acts as a power-up reset delay circuit for the microcomputer. The data input lines from the key reader to the inputs of the microcomputer are contained in a cable CBL1. The interrupt line W3 from FIG. 3A is connected to pin 3, and the line W7 from the key reader is also connected to pin 3 via capacitor C7, the line W7 normally being held at +5 volts via resistor R5. Lines W8, W9 and W10, connected to pins 30, 31, and 32 are input lines from limit switches located in the lock body and shown in FIG. 3C. Wires W11 and W12 are connected to output pins 29 and 28 by transistors 83 and 85, along with limiting resistors R6 and R7, and base input resistors R8 and R9. Pin 28 is also connected to wire W4, as shown in FIG. 3B. A switched voltage regulator has an input connected to W1, an output connected to W15, and a control line connected to pin 25 of the microcomputer.

The dead bolt actuator is driven by a reversible direct current motor, by outputs at pins 26 and 27 of the microcomputer. Pin 27, via a transistor 89, governs the supply of energy to the pole changing contacts 91, 92 of a relay having a winding 93, bridged by a diode D5, with an arc suppression diode D7 connected to the relay contacts. The output of pin 26, via transistor 95 governs the operation of the relay. Thus the output of pin 27 turns the motor on and off while the relay controlled by the output of pin 26 governs the direction of rotation of the motor. The operating power for the motor is delivered on wires W13 and W14, which have a "glitch" protector MOV2 connected across them.

Referring now to FIG. 3C, there is shown the circuitry associated with the key reader, the key device and the lock mechanism itself. The data input lines from the key reader to the microcomputer are included in a cable CBL1, as previously described. Tamper switch 69 is connected to the immediate sensor input by wire W5, also described previously. Wire W6 is the system ground connection. Wire W7 is the interrupt input to the microcomputer, which is grounded in the event of improper operation of the key reader.

The three LED indicators L1, L2 and L3, shown in FIG. 1 as being on the faceplate of the key reader, are connected as shown in FIG. 3C. The yellow LED L2 is an "ON" indicator, showing that the system is on and is connected between W1 and ground with a current limiting resistor R13 in series. The green LED L1 is connected between W1 and W11, and is turned on when the system has provided an unlock. The red LED L3 is the "ALARM" indicator and is connected to W1 and W12. It flashes when the key is inserted in the reader, and also goes on for alarm conditions.

The lock body 21 indicated in FIG. 3C by the dashed line rectangle includes the motor 99 which drives the linear actuator that extends and retracts the dead bolt 25. The motor may be of the DC permanent magnet type, and will rotate in one direction or the other depending on the relative polarity of the energy supplied to the motor over wires W13 and W14.

Also contained within lock body 21 are three switches 101, 103, and 105, one side of each switch being connected to the system ground connection W6, and the other side of switches 101, 103 and 105 being connected to wires W8, W9 and W10, respectively. These wires are connected to the input pins 30, 31, and 32 of the microcomputer, and are also connected to +5 volts through the pull-up resistors R10, R11 and R12, respectively.

Switch 101 is closed and grounds wire W8 when the deadbolt is fully retracted, switch 103 is closed when the dead bolt is fully extended, and grounds wire W9 at that time, and switch 105 is closed and grounds wire W10 when the door is fully closed.

Also shown diagrammatically in FIG. 3C is the key device 1. A re-programmable read-only memory of the same type as shown and described in connection with FIG. 3B is contained within the key device, with all of the pins brought out to a plurality of edge connector type contacts, well known in the printed circuit art. These ROM's have a capacity of 32 eight bit words, with 8 pins for the data lines, 5 pins for the address lines, one "ENABLE" line, one pin for the positive power (+5 volts) and a ground pin. These ROM's are programmed by burning out fusible links, and they can have additional programming by subsequent burning. It will be apparent that other types of microcomputers and read-only memories can be used, the necessary changes being made.

Figure 4:
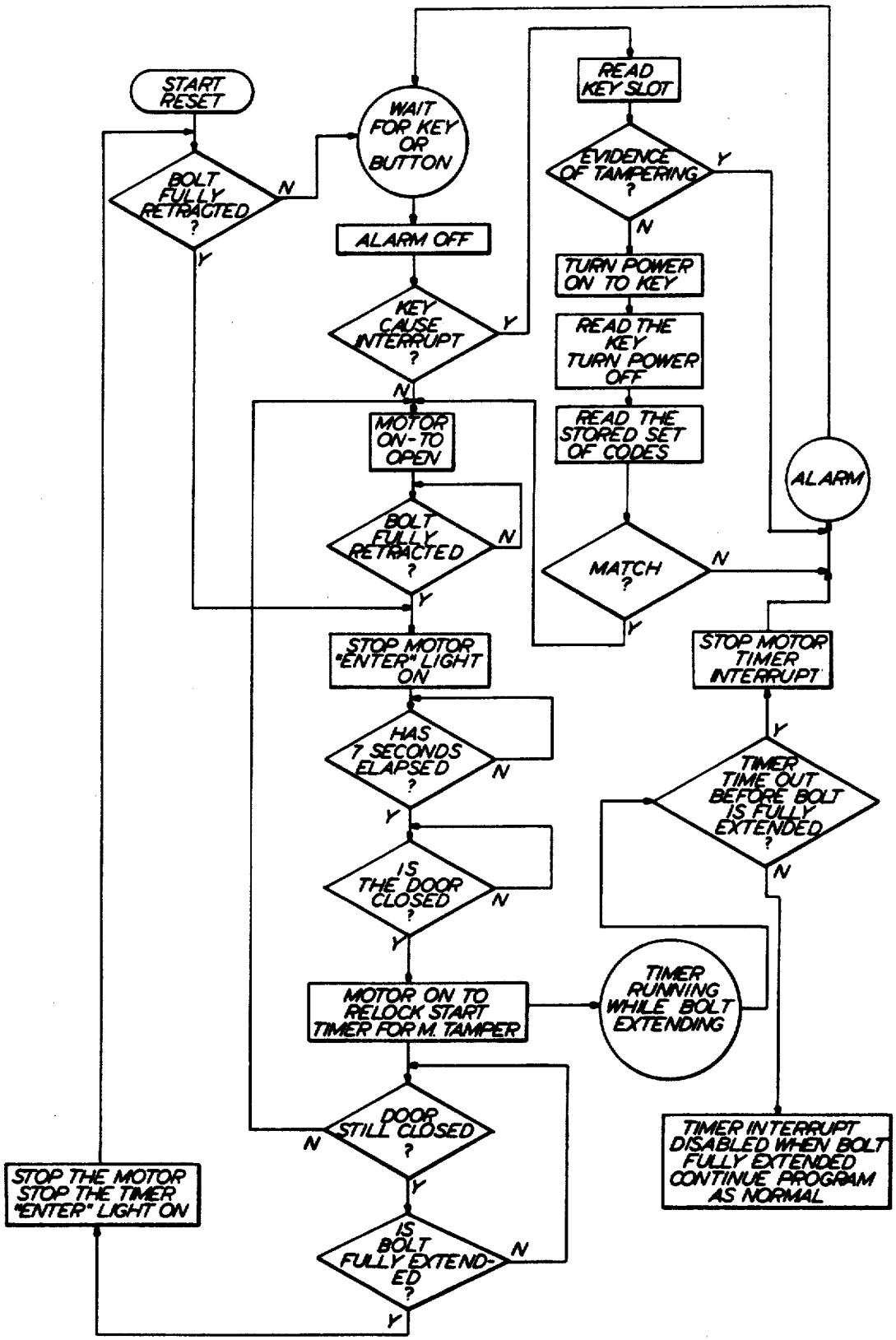
FIG. 4 is a simplified flow chart illustrating the operation of the invention, FIGS. 5A, 5B, 5C, and 5D, taken together in the order shown in FIG. 6, comprise a detailed flow chart illustrating the operation of the invention.

FIG. 4 is a diagrammatic view of a flow chart, showing, in simplified form, the various actions occurring during an unlocking operation of the system. Following the start-reset operation, a check is made of the condition of the bolt. There is then a wait for the operation of the key or the push button, after which the alarm is cut off. If the key did not cause the interrupt, the motor is turned on to retract the bolt. The program checks the condition of the bolt until it is fully retracted, at which time the motor is stopped, and the "ENTER" LED is turned on. After 7 seconds has elapsed, the door is checked to see if it is closed, and if so, the motor is started to relock the door, and a timer is started to check for mechanical tampering. If the door is still closed, the bolt is checked to see if it is fully extended, and if so the motor is stopped, as well as the timer and the "ENTER" light is turned off, followed by a return to the start or reset condition.

Considering now the branching and looping operations, if the key caused the interrupt, the program branches to a subroutine which checks first that there has been no tampering at the key slot, after which power is supplied to read the key, and then the power is turned off. The stored set of codes is then read out of the read-only memory associated with the microcomputer and compared with the codes read out of the key device. If there is a match, by both combination and sequence there is a return to the main program to open or unlock the system. If there is a mismatch the alarm sequence is invoked. The alarm sequence is also invoked if there is evidence of tampering at the key slot. Another sequence is involved when the motor is started to relock the bolt, in which a timer is running while the bolt is extending. If the timer times out before the bolt is fully extended the motor is stopped and a timer interrupt activates the alarm. It should be noted that in any alarm event, the program then returns to wait for the key or push button to be activated. Another program loop exists if in the main program a door still closed decision indicates that the door is not closed, whereupon the program returns to the lock open sequence. A check on the full extension of the bolt stops the motor and timer, turns on the "ENTER" LED and returns the program to the start-reset condition.

Figure 5A:
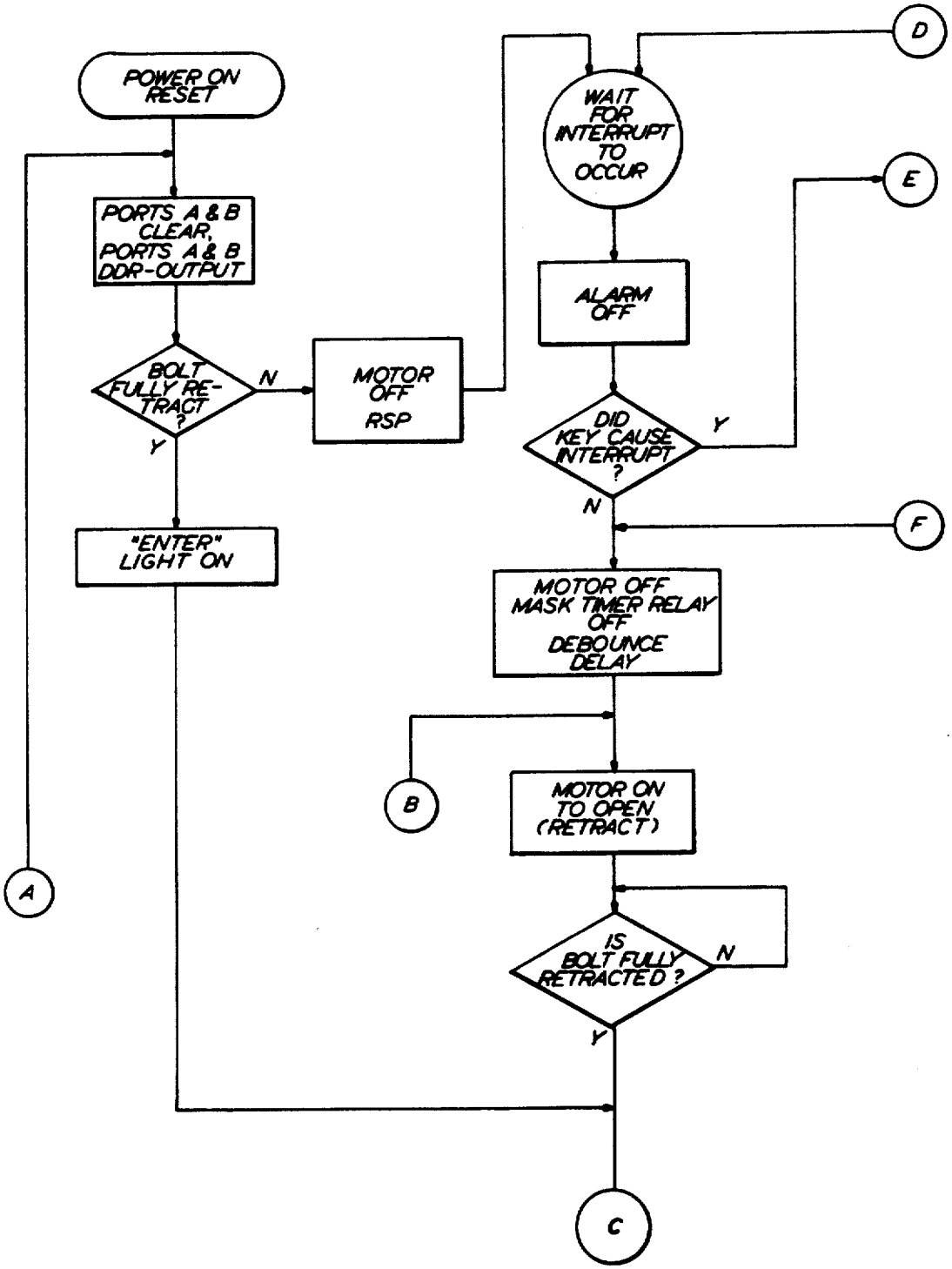
Figure 5B:
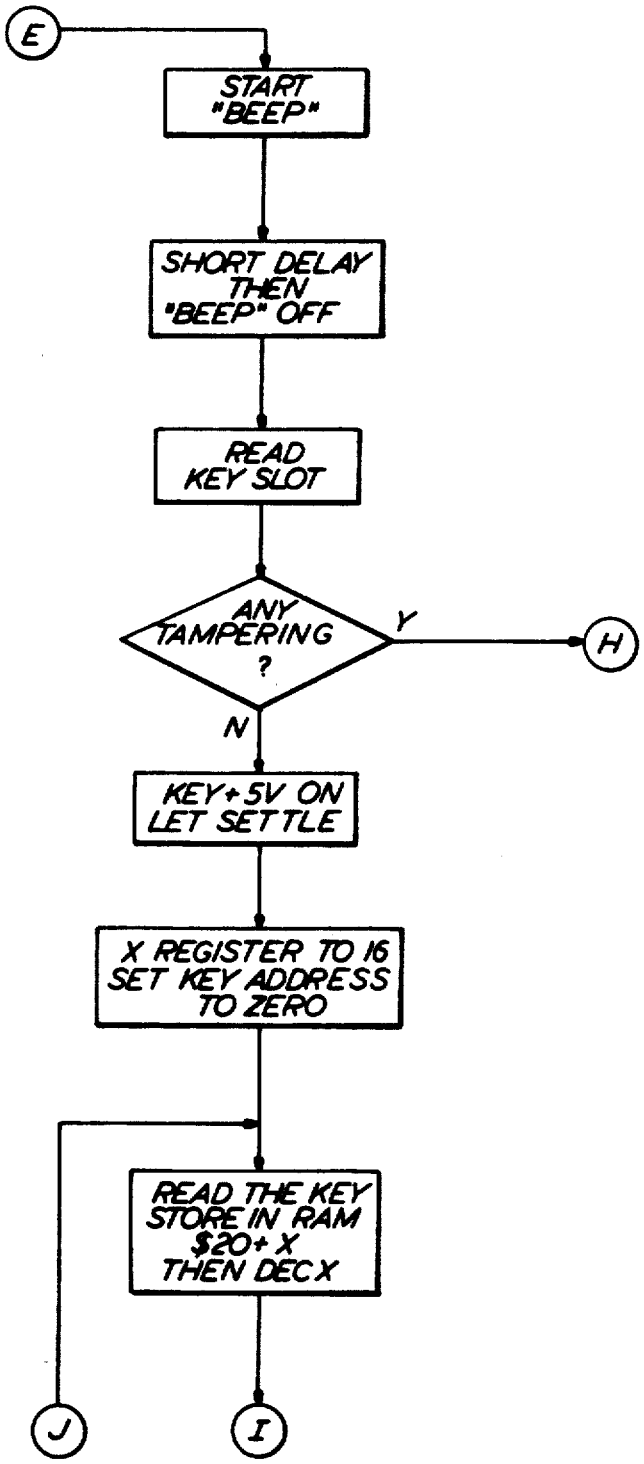
Figure 5C:
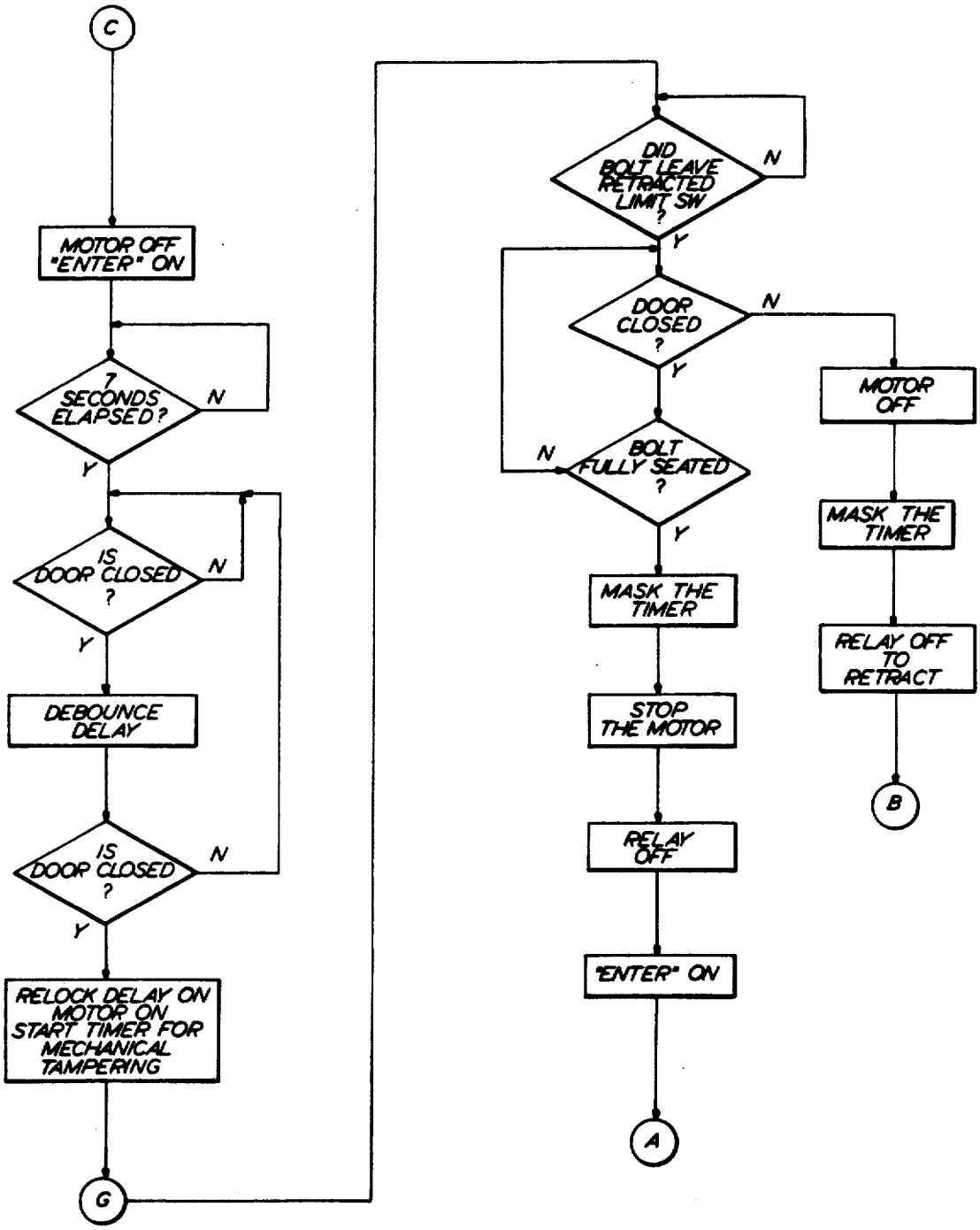
Figure 5D:
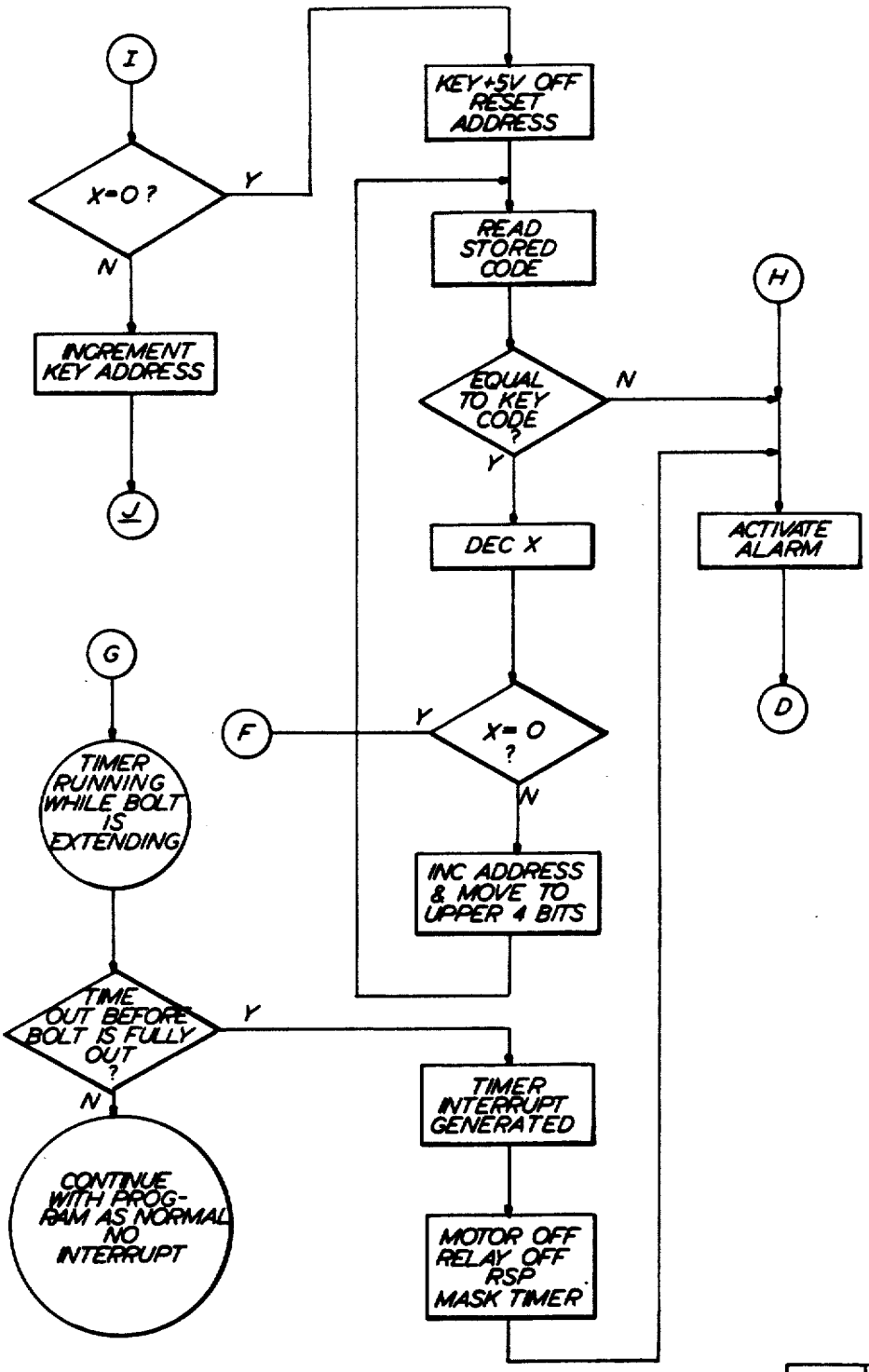
Figure 6:
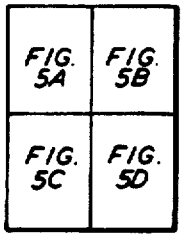
FIG. 6 is an alignment diagram for FIGS. 5A through 5D.

FIGS. 5A and 5D are preferably arranged as shown by FIG. 6, and taken together comprise a detailed flow chart of the subject invention. The connecting paths in these diagrams are indicated by small circles containing alphabet letters and indicate that the circles with like letters connect with one another.

Starting on FIG. 5A with the power ON and reset operation, the relevant ports of the microcomputer are cleared and the bolt is checked to see if it is fully retracted. If so, the "ENTER" light is turned ON and the program jumps directly to point "C" to wait until the door is once again closed. If the bolt is not fully retracted in this startup phase of the program, the motor is turned OFF and the system waits for an interrupt (key or pushbutton) to occur. When it does, any alarm currently in progress, if any, will be turned off. It the interrupt was not caused by the key, but by the pushbutton, the motor is turned ON to retract. The bolt is checked until full retraction occurs.

Continuing on FIG. 5C, via connecting point "C", the motor is then turned OFF and the "ENTER" LED is turned ON. After 7 seconds, the door is checked to see if it is closed. If the door is closed, and after a door switch debounce delay, the relock sequence occurs. The motor and relay are turned on and the timer started to determine if mechanical tampering is occurring. The bolt is checked to see if it has left the retracted limit switch. With the door closed and the bolt fully seated, the timer is masked followed by stopping the motor, turning off the relay, and turning OFF the "ENTER" LED. Via the connection point "A", the flow diagram returns to FIG. 5A to the beginning of the program following power-up and reset. In FIG. 5C, after the door closed check, if the decision is "NO", a branch occurs in which the motor is turned off, the timer is masked, and the relay is off to retract the bolt, whereupon the program is returned to the main program in FIG. 5A via the connection point "B".

In the main program the bolt is always closed (extended) and the door closed. This part of the program test that the door switch is never released when the bolt is extended. As this can only occur if the door is removed from its hinges or the door button was pushed by something other than the door and held until the bolt was fully extended, an alarm condition is called.

Continuing from point "G" in FIG. 5C, during the time that the bolt is in the process of extending, the door switch is also being continually checked to see if it was somehow released before the bolt is fully extended. If it was, the motor is stopped, reversed, the time is masked and the program returns again to point "B" where it retracts the bolt and again waits for the door to close. This ensures that a deliberate attempt to lock the system is made.

A branch program is starting at connection point "G" in FIG. 5C continues at that connection point in FIG. 5D, with the timer running while the bolt is extending. If time out does not occur before the bolt is fully out, then the program as normal is continued with no interrupt, otherwise a timer interrupt is generated, after which the motor and relay are turned off and the timer is masked, followed by activation of the alarm, which by connection point "D" returns to FIG. 5A and the wait for interrupt to occur.

In the main program, in FIG. 5A, if the response to the decision point checking whether or not there was a key-caused interrupt, if the answer is yes then the program branches via the connection point "E" to FIG. 5B to cause a short "beep" of the audible alarm. The key reading routine is invoked, first by checking for tampering and if there is any evidence of tampering the program switches over to active the alarm via connection point "H", FIGS. 5B to 5D. If there is no tampering, then the program goes on to power the key reader, set the appropriate registers in the microcomputer, read the key and store the key codes in the random-access memory. Also the value X which had been stored in RAM as the number of codes to be checked is decremented by one, then the program moves to FIG. 5D via connection point "I". If X does not equal zero, the key address is incremented by one, and the program loops back by way of connection point "J" in FIG. 5B, and continues until X=zero, on FIG. 5D. At this time, the power to the key is cut off and the address is reset, followed by readout of the stored codes from the ROM, and comparison of the key codes and the stored codes. If unequal an alarm sequence is invoked, but if equal, then the value X is decremented and then tested to see if it equals zero. If not equal to zero, the address is incremented and the program jumps back to read another stored code.

When X becomes zero, the program returns to the door unlocking sequence via connection point "F" in FIG. 5A.

Although the invention is useful for controlling access to secure areas by doors, gates etc., it obviously is applicable to any situation where a controlled function is to be governed only by authorized personnel who have been provided with a suitable key. It should also be apparent to those skilled in the art that it is not necessary that a separate housing be provided for the microcomputer and the auxiliary circuitry, but that these elements of the invention may readily be housed in a suitable sized lock housing, thereby eliminating the need for a separate control box.

From all of the foregoing, it will be apparent that my invention provides a new and improved security system which is relatively simple and economical to implement and which has a very high immunity to improper or unauthorized use, or to tampering.

Although I have herein shown and described only two preferred embodiments of my invention, it will be apparent to those skilled in the art to which the invention appertains, that various other changes and modifications may be made to the subject invention, without departing from the spirit and scope thereof, and therefore it is understood that all modifications, variations and equivalents within the spirit and scope of the subject invention are herein meant to be encompassed in the appended claims.

What is claimed is:

1. A security system for restricting access to a secure area to authorized persons, comprising, in combination:

(a) a microcomputer containing a first, selectively programmable read-only memory;

(b) a key device having mounted thereon a second, selectively programmable read-only memory;

(c) each of said first and second memories containing corresponding pluralities of corresponding, multi-digit, combination codes arranged in corresponding sequences;

(d) key reader means connected to said microcomputer and having a receptacle for receiving therein a portion of said key device to establish electrical connections between said key device and said microcomputer;

(e) means governed by said microcomputer for transferring data from said key device to said microcomputer;

(f) a controlled access device governing physical access to said secure area; and (g) circuit means connecting said microcomputer and said access device, said microcomputer being effective to compare said multi-digit combination codes, one complete code at a time, and to compare said code sequences stored in said first and second memories and to control said circuit means to enable said access device when and only when such comparison shows equality of said multi-digit combination codes and their sequence.

2. A security system according to claim 1 wherein said second memory comprises a chip which is selectively programmable and reprogrammable by external programming means after mounting on said key device.

3. A security system according to claim 2 wherein said controlled access device comprises a deadbolt movable between retracted and extended positions by a reversible electric motor controlled by said circuit means.

4. A security system according to claim 3 and further including means to control said circuit means to halt operation of said deadbolt during movement thereof in response to improper operation of said security system.

5. A security system according to claim 1 and further including means controlled by said microcomputer for providing electrical power through said electrical connections only after verification of insertion of a proper key device into said receptacle.

6. A security system according to claim 1 and further including a battery mounted on said key device for supplying operating power for said circuit means through said key device, said battery having an initial, predetermined charge to render said key device operable for a predetermined time.

*7. A self-monitoring security system for selectively preventing and permitting movement of a closure member between open and closed positions, said system comprising:*

*a) a deadbolt movable from an extended to a retracted position for permitting movement of said closure member from said closed to said open position thereof;*

*b) a reversible electric motor operatively connected to said deadbolt for movement thereof between said extended and retracted positions in response to actuation of said motor;*

*c) a microcomputer including memory means programmed to generate a first output signal in response to a first input signal, generated in response to matching of a code pre-programmed in said memory means by a code inserted in a code-receiving device, when said closure member is in said closed position and said deadbolt is in said extended position;*

*d) circuit means connecting said microcomputer to receive said first input signal and further connecting said microcomputer to said motor for actuation thereof to move said deadbolt toward said retracted position in response to said first output signal;*

*e) said memory means being further programmed to generate a plurality of individual, time-spaced output*

*signals in response to a respective plurality of time-spaced input signals; and* f) *means for generating said plurality of time-spaced input signals in response to a predetermined sequence of movements of said deadbolt between said extended and retracted positions and of said closure member between said open and closed positions member.*

*8. The security system of claim 7 wherein said means for generating said plurality of input signals includes a first limit switch actuable in response to said deadbolt reaching said retracted position.*

*9. The security system of claim 7 wherein said means for generating said plurality of input signals further includes a second limit switch actuable in response to said deadbolt reaching said extended position.*

*10. The security system of claim 8 wherein said means for generating said plurality of input signals further includes a switch responsive to said open and closed positions of said closure means.*

*11. The security system of claim 7 wherein said means for generating said plurality of input signals further includes time-responsive means operable to generate one of said plurality of output signals upon expiration of a predetermined time period.*

*12. The security system of claim 7 and further including an alarm device actuable in response to detection of absence of at least one of said plurality of input signals by said microcomputer.*

*13. The security system of claim 12 wherein said alarm device is at a location remote from said security device.*

*14. A self-monitoring security system including a deadbolt member movable between extended and retracted positions to lock and unlock, respectively, a closure member movable between open and closed positions to permit and prevent access to a secured area, said security system comprising:* a) *means for generating first and second electrical signals in response to said deadbolt being in said extended and retracted positions, respectively;* b) *means for generating third and fourth electrical signals in response to said closure member being in said open and closed positions, respectively;* c) *a microprocessor including memory means responsive to said first, second, third and fourth electrical signals to generate a plurality of output signals; and* d) *circuit means responsive to said output signals for controlling movement of said deadbolt.*

*15. The security system of claim 14 and further including means for generating a fifth electrical signal in response to expiration of a predetermined time period between generation of at least one pair of said first, second, third and fourth electrical signals.*

*16. The security system of claim 15 and further including a reversible electric motor operable to move said deadbolt between said extended and retracted positions in response to actuation by said circuit means, and wherein said fifth electrical signal is effective to cease actuation of said motor by said circuit means.*

* * * * *